June 5, 1951 W. E. McCULLOUGH ET AL 2,555,497
PROCESS OF MANUFACTURING BEARINGS
Filed Feb. 12, 1945
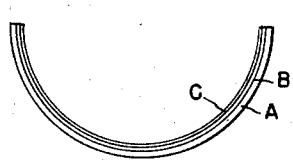
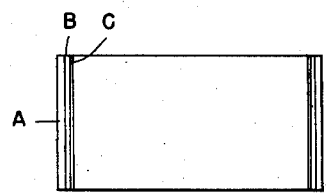
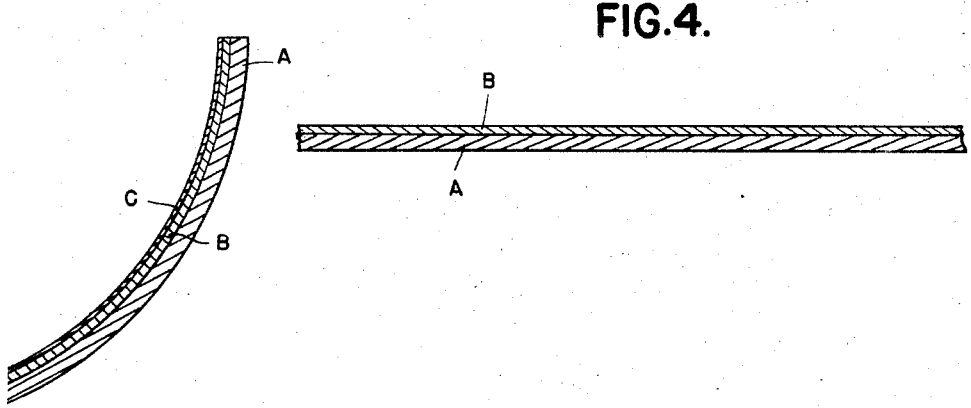
INVENTORS
WILLIAM E. McCULLOUGH
BY EDWIN O. GOERKE
ATTORNEYS Patented June 5, 1951

2,555,497

UNITED STATES PATENT OFFICE 2,555,497

PROCESS OF MANUFACTURING BEARINGS

William E. McCullough, Detroit, and Edwin O. Goerke, Dearborn, Mich., assignors to Bohn Aluminum & Brass Corporation, Detroit, Mich., a corporation of Michigan Application February 12, 1945, Serial No. 577,514

1 Claim. (Cl. 29—149.5)

The invention relates to bearings of that type comprising a shell or backing formed of a relatively strong material, such as steel or bronze, and a coating of softer metal on the bearing surface. It is well known that steel has poor bearing properties but has great strength and ductility. It is also recognized that certain cast bronzes have somewhat better bearing characteristics than steel but are lower than the latter in strength and ductility. This is particularly true where tin and lead in substantial amounts are ingredients of the composition. Also a bronze including these elements is lacking in hot working properties so that it is not suitable for manipulation by hot rolling or by otherwise hot fashioning.

It is one of the objects of the instant invention to obtain a construction of bearing having a shell or backing which combines adequate strength with fairly good bearing properties.

It is a further object to obtain a construction which can be easily manufactured at relatively low cost and with these objects in view the invention consists, first, in a construction of bearing including a composite shell or backing and, second, in the method of manufacture as hereinafter set forth.

In the drawings:

Fig. 1 is an end elevation of a half bearing of the improved construction;

Fig. 2 is a plan view thereof;

Fig. 3 is a cross section through a portion of the bearing drawn to an enlarged scale;

Fig. 4 is a longitudinal section through the blank from which the bearing is formed.

To obtain a bearing combining the desirable characteristics above referred to, we, first, form a composite shell including a layer of steel and a layer of bronze or brass of the following composition:

| | |
|---|---|
| Copper | 55% to 65% |
| Manganese | 2% to 4% |
| Aluminum | 1% to 3% |
| Silicon | .6% to 1.5% |
| Lead | .35% max. |
| Iron | .25% max. |
| Other impurities | .20% max. |
| Zinc | Remainder |

Flat plate of steel A of suitable thickness is clad by rolling onto it an overlaying plate B of the above composition. The bimetal plate is then processed by further hot rolling to approximately the desired thickness after which it may be cleaned of oxides by acid dipping and further rolled in the cold state to the exact required thickness. The physical properties of the brass include:

| | |
|---|---|
| Yield strength, p. s. i. | 40,000 to 55,000 |
| Tensile strength, p. s. i. | 85,000 to 95,000 |

These properties are comparable with those of a low carbon cold rolled steel.

The bimetal strip may then be slit or blanked to convenient sizes and formed in press-dies to suitably shaped and dimensioned half bearing shells. The half bearing shells may then be suitably cleaned and coated on their interior surface with a thin layer C (.001 to .004 inch in thickness) of soft bearing metal, such as lead alloy.

With a bearing constructed as above described the lining of soft metal possesses great conformability and, therefore, will adapt itself to slight irregularities in shaft surfaces. Also, articles of grit, road dirt, metal chips or other abrasive articles that may be in the lubricating system will imbed themselves in the soft metal more readily than they would in the brass. Under conditions of very severe usage combined with lack of proper lubrication, portions of the thin bearing metal lining may be worn off or may be abraded away. In such cases, the inner layer of brass will have sufficiently good bearing characteristics to greatly prolong the useful life of the bearing and to avoid a serious service failure in the field.

What we claim as our invention is:

In a method of forming bearings, the steps of overlaying plate steel with a layer of solid brass composed of copper 55% to 65%, manganese 2% to 4%, aluminum 1% to 3%, silicon .6% to 1.5%, zinc 45.5% to 36.5%, hot rolling the composite structure to reduce the same to a predetermined thickness, cold rolling to further reduce the thickness and to work the overlying metal, and in fashioning the bearing therefrom.

WILLIAM E. McCULLOUGH.
EDWIN O. GOERKE.

REFERENCES CITED

The following references are of record in the file of this patent:

UNITED STATES PATENTS

| Number | Name | Date |
|---|---|---|
| 811,954 | Richardson | Feb. 6, 1906 |
| 1,551,443 | Vaders | Aug. 25, 1925 |
| 1,792,565 | Barton | Feb. 17, 1931 |
| 1,956,462 | Knuth | Apr. 24, 1934 |
| 1,956,464 | Palm | Apr. 24, 1934 |
| 2,198,254 | Koehring | Apr. 23, 1940 |
| 2,254,516 | Farr | Sept. 2, 1941 |
| 2,267,342 | Schwartz | Dec. 23, 1941 |
| 2,316,119 | Bagley | Apr. 6, 1943 |